March 2, 1926.
J. W. DEARING
1,574,959
VALVE MECHANISM CONTROL
Filed June 21, 1922     2 Sheets-Sheet 1
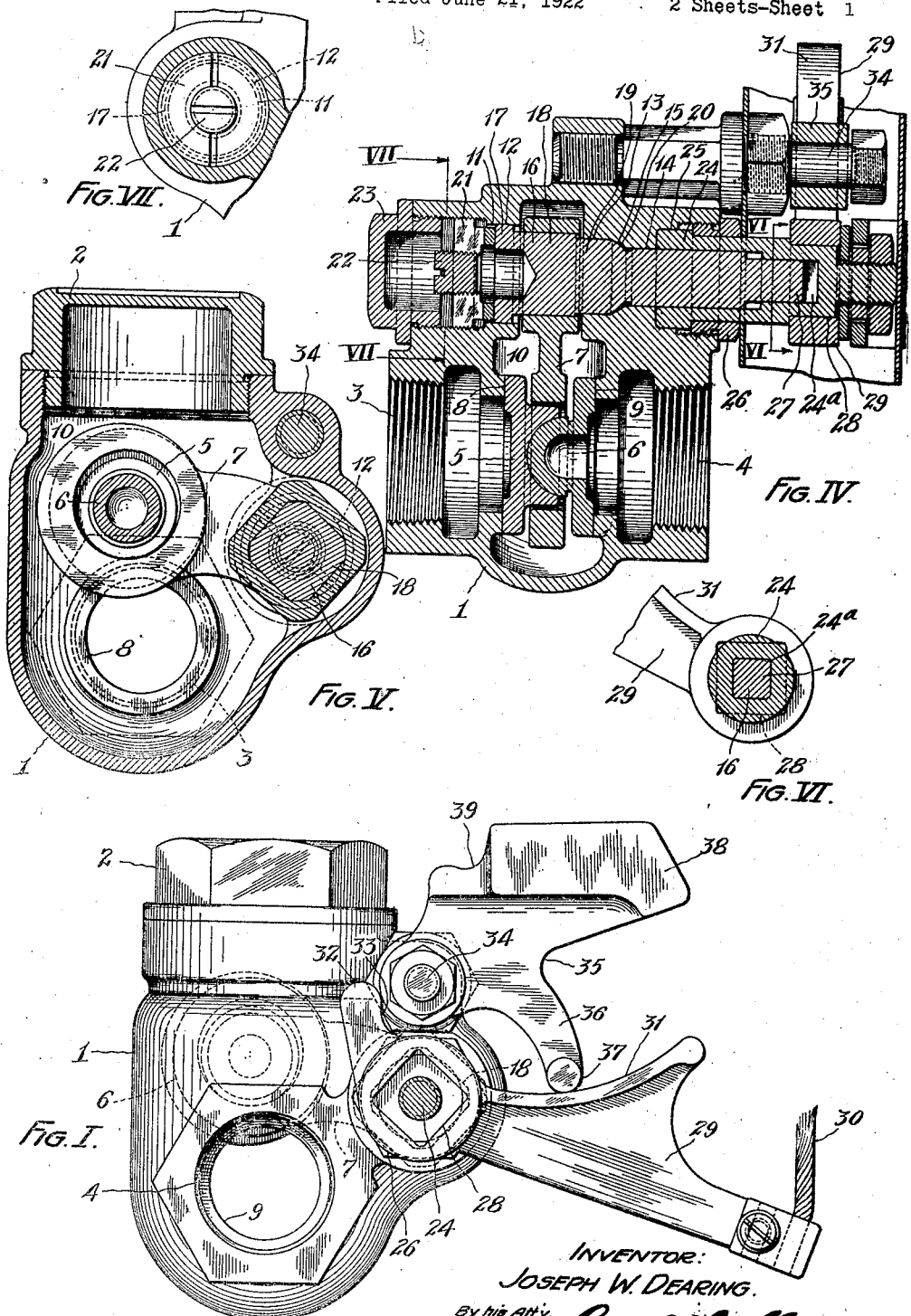
INVENTOR:
JOSEPH W. DEARING.
By his Att'y.

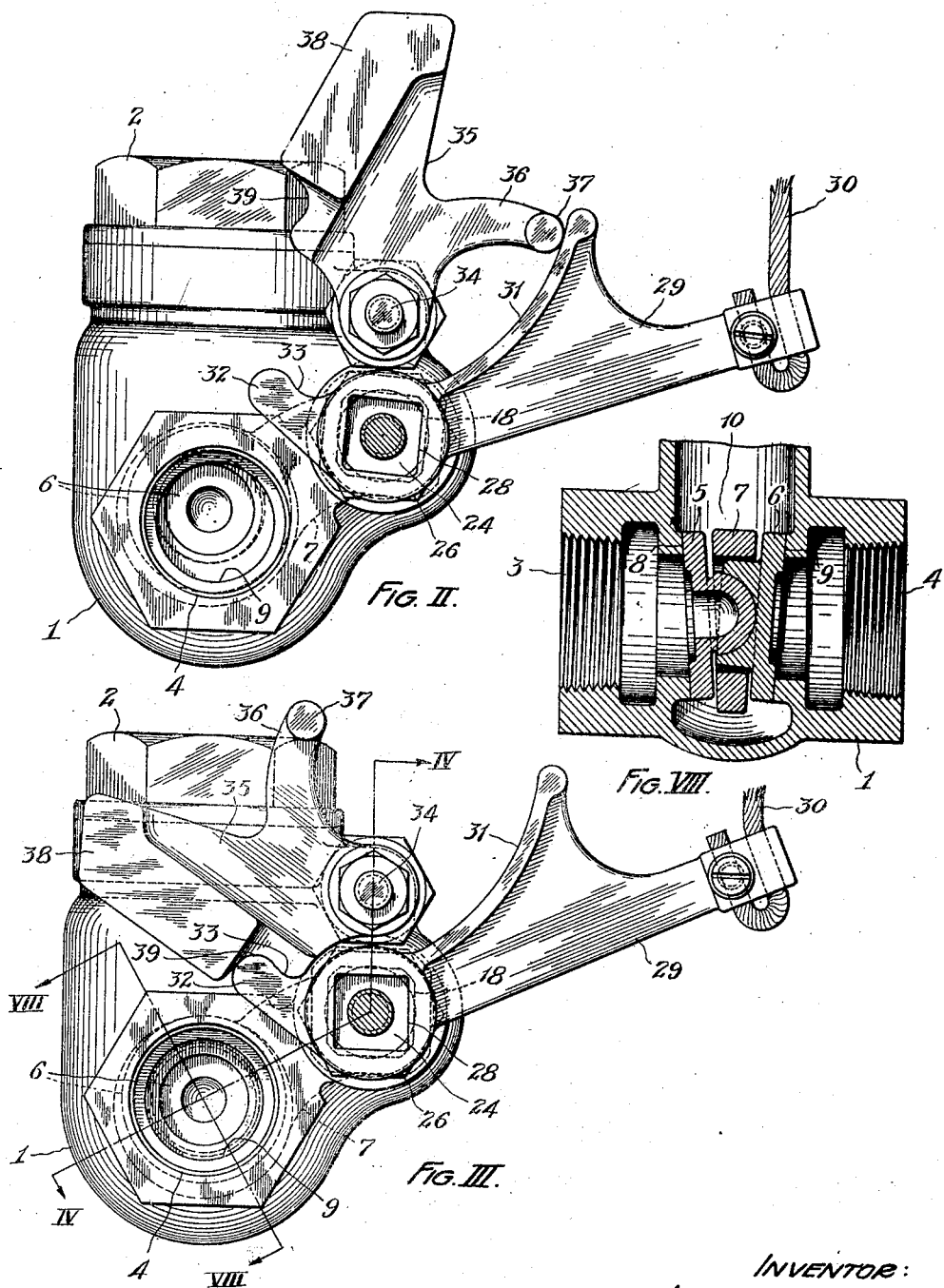

Patented Mar. 2, 1926.

1,574,959

UNITED STATES PATENT OFFICE.

JOSEPH W. DEARING, OF CLEVELAND, OHIO, ASSIGNOR, BY MESNE ASSIGNMENTS, TO SPRINGFIELD LUMBER COMPANY, OF SPRINGFIELD, ILLINOIS, A CORPORATION OF ILLINOIS.

VALVE-MECHANISM CONTROL.

Application filed June 21, 1922. Serial No. 569,822.

*To all whom it may concern:*

Be it known that I, JOSEPH W. DEARING, a citizen of the United States, residing at 10511 Greenlawn Ave., Cleveland, in the State of Ohio and Cuyahoga County, have invented a new and useful Improvement in Valve-Mechanism Controls, of which the following is a specification, the principle of the invention being herein explained and the best mode in which I have contemplated applying that principle, so as to distinguish it from other inventions.

My invention pertains to a valve mechanism control and more particularly to a lever actuating mechanism together with a movable device adapted in one of its positions to engage the actuating lever to yieldingly hold the valve open whereas in another position to engage said lever so as to lock it against opening movement.

The subject matter of this application constitutes a modification, for some purposes an improvement, upon that shown described and claimed in my patent for gas-cut-off apparatus No. 1,264,283 issued April 30, 1918.

Adverting to the drawings:

Figure I is an end elevation partly in section showing a valve mechanism control embodying my invention, with the parts in the position assumed when the valve is open.

Figure II is an end elevation corresponding to Figure I showing the parts in an intermediary position.

Figure III is a view corresponding to Figures I and II showing the positions occupied by the parts when the valve is closed.

Figure IV is a developed section on line IV—IV of Figure III.

Figure V is a vertical cross section through the valve when in its open position.

Figure VI is a section on line VI—VI of Figure IV.

Figure VII is a section on line VII—VII of Figure IV.

Figure VIII is a section on line VIII—VIII of Figure III.

A valve casing 1 is provided above with a top screw cap 2 affording communication to the interior. The lower part of the casing is fashioned with oppositely directed tapped inlet and outlet openings 3 and 4, the communication between which being subject to the control of a conventional type of gate valve including the disks 5 and 6 pivoted against each other through an opening in the wedge shaped extremity of a valve actuating yoke 7 adapted, in a manner common to the art, to press the disks 5 and 6 firmly against seats 8 and 9 which are provided around the inner ends of the inlet and outlet. The yoke 7 is to be swung through an arc in a space 10 in a manner to be later explained. Inasmuch as nothing is claimed for this old construction it has been briefly described.

To one side the valve casing is fashioned with a variformed bore 11 fashioned with a bearing surface 12 and more inwardly with another bearing surface 13 of smaller diameter as may be seen in Figure IV. In turn, beyond the bearing 13 is a still smaller bearing surface 14. Between the bearing surfaces 13 and 14 is a conical surface 15 adapted to serve as a seat for a mechanical seal to be presently explained. A variformed floating shaft 16 is adapted for fitting within the bore 11 so that its one end 17 fits within the bearing 12, so that an adjoining squared section 18 fits within a correspondingly squared opening in the other end of the yoke 7, so that another next adjacent section 19 fits within the bearing 13, so that a spherical surface 20 is adapted to have a wedge contact with the conical seat 15 and so that the round portion of the shaft 16 which is of smallest diameter fits within the bearing 14. The end 17 of the shaft is held in place by a split nut 21 cooperating with threads formed in the bore 11 and adapted to be locked in position by the expansive action of a plug 22, these parts being separately shown in Figure VII. The usual closing cap 23 is provided.

Encircling the smallest round portion of the shaft is a sleeve 24 movable in a bearing and held in place by a nut 25$^a$. The inner end 24$^a$ of the closed bore in the sleeve 24 is squared and occupied by the squared extremity 27 of the shaft so that any turning movement imparted to the sleeve will turn the shaft 16, rock the yoke 7 and oscillate the gate valve between its open and closed positions.

The outer end of the sleeve 24 is squared at 28 for the reception of the square socket of an actuating lever 29 as is separately shown in Figure VI. The lever 29 is to be held in place by one or more nuts secured upon the screwed threaded outer extremity of the sleeve 24. As mounted, an upward pull upon the extremity of the lever 29 through the medium of an attached cable 30 will act to close the valve.

Directing attention now to Figures I, II and III in the order named it will be observed that the lever 29 has an intermediate section fashioned above as an arcuate or cam surface 31. The lever 29 is provided on the opposite side of its point of attachment with a projection or upward hook 32 so that the lever 29 may be said to be double armed. Adjacent the projection 32 I preferably form a shallow recess 33. Pivotally mounted on a stud 34 carried by the valve casing directly over the sleeve 24 is a double armed weight 35 one arm 36 of which has a curved extremity 37 adapted to ride upon the cam surface 31 during the initial upward movement of the lever 29. The other arm 38 of the weighted portion is fashioned with a recess 39 adapted, as will now be described, to be occupied by the projection 32 and incidentally so that one of the portions of the weight 38 which borders the recess 39 occupies the recess 33.

When the valve is in its open position as shown in Figure I the weight 38 gravitationally holds the extremity 37 against the surface 31 thereby yieldingly holding the valve open. When the cable 30 is pulled for the purpose of closing the valve the rising movement of the surface 31 carries the weight 35 up past its center of gravity whereupon it suddenly falls against the projection 32 to the position shown in Figure III the impact serving to more tightly wedge the disks 5 and 6 against their seats. In such position the valve will be positively locked closed until the weight 35 is manually lifted from its locking position preparatory to being swung back to the other side to again hold the valve yieldingly open.

I claim:—

1. A valve mechanism control comprising the combination of a valve casing, a valve operating element adapted to turn therein, a doubled-armed member operatively connected with said element, and a weight movably connected with said casing, said weight adapted during movements of the parts from open to closed position to engage one arm of said member and thereby yieldingly hold the valve open until carried upwardly to its dead center position and thereafter adapted to fall upon the other arm of said member and thereby lock the valve against opening movement.

2. A valve mechanism control comprising the combination of a valve casing, a valve therein, a lever operatively connected with said valve, said lever being fashioned above with a recess, and a weight pivotally mounted on said casing, said weight adapted when at one point in its pivotal movement to rest upon said lever and thereby yieldingly hold the valve open and when at another point in its pivotal movement to fall into said recess and thereby lock the valve against opening movement.

3. A valve mechanism control comprising the combination of a valve casing, a valve therein, a double-armed lever operatively connected with said valve, one arm of said lever being fashioned above with a cam surface, and a double-armed weight pivotally mounted on said casing, one arm of said weight adapted in one position gravitationally to rest upon said cam surface and thereby yieldingly hold the valve open and the other arm of said weight adapted in another position to engage the other arm of said lever and thereby lock the valve against opening movement.

4. A valve mechanism control comprising the combination of a valve casing, a valve therein, a double-armed lever for operating said valve, one arm of said lever being fashioned with an upper cam surface, the other arm of said lever being provided with a recess, and a weighted sector pivotally mounted over said lever adapted to be moved past its center of gravity by the lifting engagement with one side thereof of said cam surface when actuated to its valve-closing position and then the other side of said sector allowed gravitationally to fall into said recess to lock the valve closed.

5. A valve mechanism control comprising the combination of a valve casing, a valve therein, a double-armed valve actuating member pivotally connected with said valve casing, and a weight pivotally attached to said casing at a point above the pivot of said actuating member, said member and weight being fashioned with portions designed and adapted to have a tongue and groove connection, said weight adapted in one position to gravitationally rest upon said member and thereby yieldingly hold the valve open and in another position adapted to establish said tongue and groove connection and thereby lock against opening movement of the valve.

6. A valve mechanism control comprising the combination of a valve casing, a valve therein, an actuating member operatively connected with said valve, and a weight pivotally carried by said casing, said member and weight being fashioned one with a projection and the other with a depression, said weight adapted when at one point in its pivotal movement to rest upon said member and thereby yieldingly hold the valve open and when at another point in its pivotal movement to cause said depression to be occupied by said projection and thereby lock the valve against opening movement.

Signed by me, this 25th day of May, 1922.

JOSEPH W. DEARING.